US008976651B2

(12) United States Patent
Nakao

(10) Patent No.: US 8,976,651 B2
(45) Date of Patent: Mar. 10, 2015

(54) LOAD BALANCE CONTROL UNIT, LOAD BALANCE CONTROL METHOD AND STORAGE MEDIUM

(75) Inventor: Yoshitaka Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

(21) Appl. No.: 13/576,566

(22) PCT Filed: Mar. 15, 2011

(86) PCT No.: PCT/JP2011/056684
§ 371 (c)(1),
(2), (4) Date: Aug. 1, 2012

(87) PCT Pub. No.: WO2011/118542
PCT Pub. Date: Sep. 29, 2011

(65) Prior Publication Data
US 2012/0300623 A1    Nov. 29, 2012

(30) Foreign Application Priority Data

Mar. 25, 2010  (JP) ................................ 2010-069521

(51) Int. Cl.
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC ............ 370/230; 370/235; 370/315; 709/240

(58) Field of Classification Search
USPC ................. 370/230–235, 263–315, 492–501;
709/221–229, 238–242
See application file for complete search history.

(56) References Cited

U.S. PATENT DOCUMENTS

| 7,260,647 | B2 * | 8/2007 | Espieu et al. ................. 709/240 |
| 7,310,674 | B2 * | 12/2007 | Mitsumori .................... 709/226 |
| 7,630,317 | B2 * | 12/2009 | Okamura et al. ............. 370/237 |
| 8,050,211 | B2 * | 11/2011 | Nakata .......................... 370/315 |

(Continued)

FOREIGN PATENT DOCUMENTS

| JP | 2000-216815 | 8/2000 |
| JP | 2000-307598 | 11/2000 |

(Continued)

OTHER PUBLICATIONS

International Search Report, PCT/JP2011/056684, Jun. 21, 2011.
Japanese Official Action—2012-506990—Jan. 7, 2014.

*Primary Examiner* — Man Phan
(74) *Attorney, Agent, or Firm* — Young & Thompson

(57) ABSTRACT

[Solution to Problem] A load balance control unit, which is included in a transmission apparatus for transmitting a plurality of units of data, each being a piece of transmission data delimited by a given data length, to an opposite apparatus via a plurality of transmission lines, includes sorting buffers which are provided for the respective transmission lines; a threshold setting element which sets upper limit retention threshold values for the respective sorting buffers; and a sorting determination element which determines, for each of the units of data, in which of the sorting buffers the each of the units of data is to be written, taking into consideration retention states and the upper limit retention threshold values of the respective sorting buffers, and a data amount of the each of the units of data.

11 Claims, 10 Drawing Sheets

(56) References Cited

U.S. PATENT DOCUMENTS

| | | |
|---|---|---|
| 8,081,579 B2 * | 12/2011 | Morita .......................... 370/252 |
| 8,526,353 B2 * | 9/2013 | Yokota .......................... 370/315 |
| 8,649,264 B2 * | 2/2014 | Parizhsky et al. ............. 370/230 |
| 2005/0190697 A1 * | 9/2005 | Dohi et al. .................... 370/235 |
| 2006/0067291 A1 | 3/2006 | Nakata |
| 2010/0150076 A1 * | 6/2010 | Nakata ......................... 370/328 |

FOREIGN PATENT DOCUMENTS

| | | |
|---|---|---|
| JP | 2001-136208 | 5/2001 |
| JP | 2005-252333 | 9/2005 |
| JP | 2006-129439 | 5/2006 |
| JP | 2006-345323 | 12/2006 |
| JP | 2007-60494 | 3/2007 |
| JP | 2007-104054 | 4/2007 |

* cited by examiner

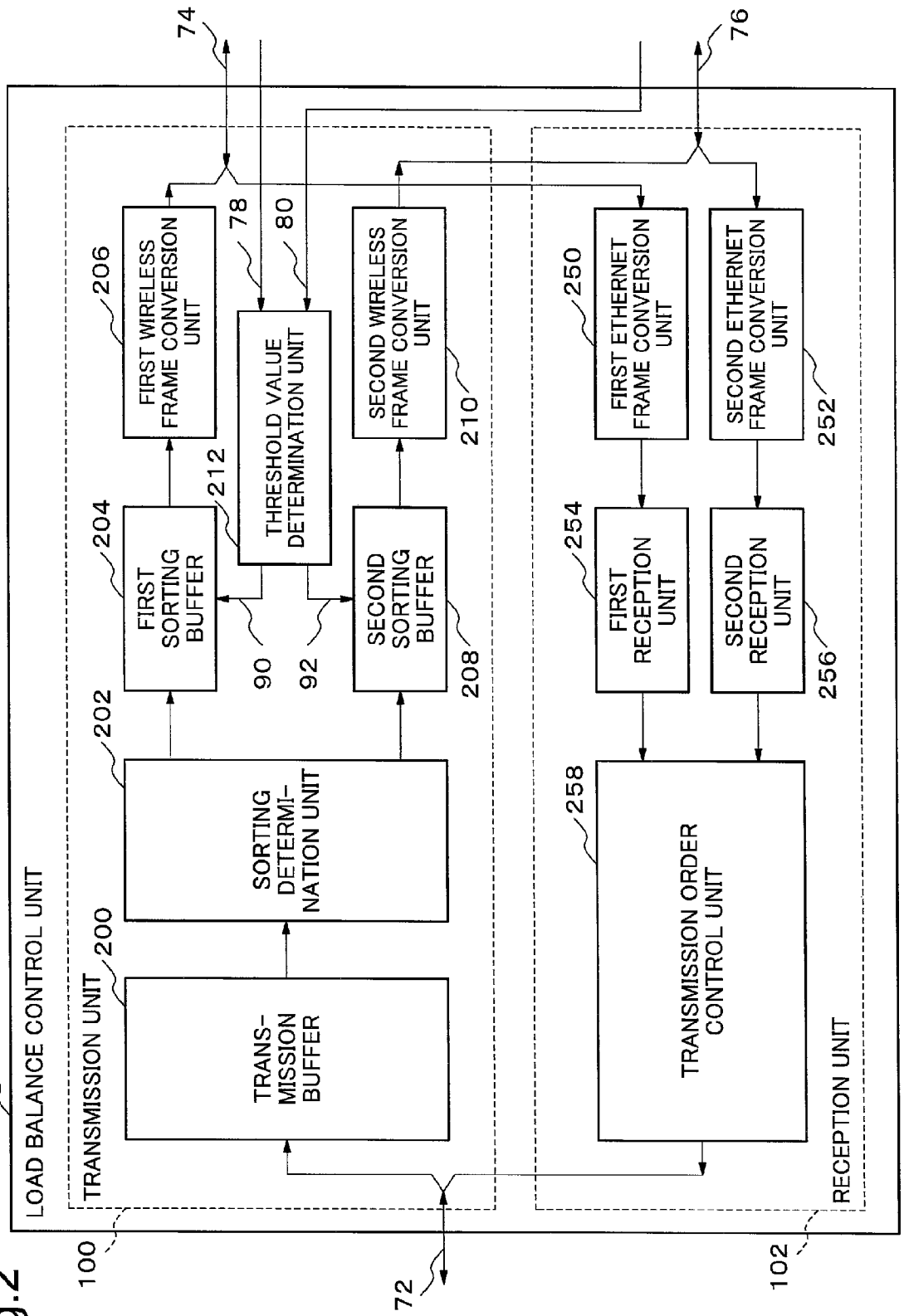

FIRST THRESHOLD VALUE 90

FIRST THRESHOLD VALUE 90

FIRST THRESHOLD VALUE 90

SECOND THRESHOLD VALUE 92

FIRST THRESHOLD VALUE 90

SECOND THRESHOLD VALUE 92

LOAD BALANCE CONTROL UNIT, LOAD BALANCE CONTROL METHOD AND STORAGE MEDIUM

TECHNICAL FIELD

The present invention relates to a load balance control unit, a load balance control method and a storage medium.

BACKGROUND ART

Generally, the bandwidth of one wireless communication line is approximately several hundreds Mbps. In contrast, in the case of a user side communication line, it has a large bandwidth of, for example, 1 Gbps (bits per second) or 10 Gbps. In order to eliminate this bandwidth gap, it has been well known to employ the method of increasing the total bandwidth of the wireless communication line side by using a plurality of wireless communication lines. In this case, load balance control (also referred to as load sharing control) for balancing loads given to the respective wireless communication lines has been performed.

As an example of this load balance control, for example, load balance control by means of a so-called "round robin" method, in which loads (for example, transmitting packets or transmitting frames) are sequentially allocated to the individual wireless communication lines, can be taken. For example, in the case where a series of frames (1, 2, 3, 4, 5 . . . ) are sorted to two wireless communication lines, the frames 1, 3, 5 . . . are sorted to one line buffer, and the frames 2, 4 . . . are sorted to the other line buffer.

Further, in Patent Literature 1, there is described a load sharing technology, in which, for each of communication lines, an available remaining line capacity thereof is calculated on the basis of the difference between a preset threshold value and a current data-transmission amount thereof, and increased transmitting data or transmitting data having overflowed from a certain one of the communication lines is sorted to any communication lines thereof each having the available remaining line capacity.

Further, in Patent Literature 2, there is described another load sharing technology, in which, when the storage amount of data stored in a certain buffer (one of buffers provided for respective communication lines) has exceeded a preset storage-capacity threshold value thereof, the buffer is switched to another buffer, into which data having been received from an external network is stored.

CITATION LIST

Patent Literature

[Patent Literature 1] Japanese Unexamined Patent Application Publication No. 2001-136208
[Patent Literature 2] Japanese Unexamined Patent Application Publication No. 2006-345323

SUMMARY OF INVENTION

Technical Problem

In the case where frames targeted for sorting have a fixed length, there occurs no particular problem even if the round robin method is employed for the sorting. However, in the case of communication protocols in which the length of each of frames targeted for sorting varies, such as Ethernet (registered trade mark) protocol, some problems are likely to occur if such an unsophisticated method as the round robin method is employed for the sorting. For example, here, it is assumed a case where a frame having a large amount of data has been written into one of line buffers, and as a result, the line buffer is currently in a full state. In the case of the round robin method, as described above, it has a rule that each frame is to be alternately sorted, and thus, in the foregoing case where one of line buffers is in a full state, as a result, any more frames cannot be written into the other one of the line buffers even if the other one of the line buffers has a remaining storage capacity. Consequently, the bandwidth of one of the communication lines is not effectively utilized, and further, possibly, occurrences of a data loss or the like are also concerned. Moreover, variations occur among the transmission delays of the respective communication lines, so that, possibly, the transmission orders of frames are also reversed. That is, in the case where variable-length frames are sorted by means of the round robin method, possibly, there also occurs a situation where the transmission orders of frames cannot be guaranteed.

Furthermore, in the case of a configuration where variable-length frames are necessary to be dealt with, and further, for example, the threshold values of corresponding line buffers dynamically change, frame sorting processing becomes more complicated, so that the variable-length frames cannot possibly be dealt with merely by employing such an unsophisticated method as the round robin method.

In Patent Literature 1 and Patent Literature 2, similarly, it is hard to say that a technology which makes it possible to perform appropriate load sharing control in the case where variable-length frames are necessary to be dealt with, and further, the threshold values of corresponding line buffers dynamically change is sufficiently disclosed.

An object of the present invention is to provide a load balance control unit, a load balance control method and a storage medium which make it possible to, even in the case where variable-length frames are necessary to be dealt with, and further, the threshold values of buffers for respective transmission lines dynamically change, perform appropriate load sharing control of the individual transmission lines.

Solution to Problem

A load balance control unit according to the present invention is included in a transmission apparatus for transmitting a plurality of units of data, each being a piece of transmission data delimited by a given data length, to an opposite apparatus via a plurality of transmission lines, and includes sorting buffers which are provided for the respective transmission lines; a threshold setting means which sets upper limit retention threshold values for the respective sorting buffers; and a sorting determination means which determines, for each of the units of data, in which of the sorting buffers the each of the units of data is to be written, taking into consideration retention states and the upper limit retention threshold values of the respective sorting buffers, and a data amount of the each of the units of data.

A load balance control method according to the present invention is used for a transmission apparatus which transmits a plurality of units of data, each being a piece of transmission data delimited by a given data length, to an opposite apparatus via a plurality of transmission lines, and includes setting upper limit retention threshold values of sorting buffers which are provided for the respective transmission lines; and determining, for each of the units of data, in which of the sorting buffers the each of the units of data is to be written, taking into consideration retention states and the upper limit retention threshold values of the respective sorting buffers, and a data amount of the each of the units of data.

A storage medium according to the present invention stores therein a computer program for causing a computer of a transmission apparatus, which transmits a plurality of units of data, each being a piece of transmission data delimited by a given data length, to an opposite apparatus via a plurality of transmission lines, to execute processing including processing for setting upper limit retention threshold values of sorting buffers which are provided for the respective transmission lines; and processing for determining, for each of the units of data, in which of the sorting buffers the each of the units of data is to be written, taking into consideration retention states and the upper limit retention threshold values of the respective sorting buffers, and a data amount of the each of the units of data.

Advantageous Effects of Invention

According to the present invention, even in the case where variable-length frames are necessary to be dealt with, and further, the threshold values of buffers for respective transmission lines dynamically change, it is possible to perform appropriate load sharing control of the individual transmission lines.

BRIEF DESCRIPTION OF DRAWINGS

FIG. 2 is a block diagram illustrating an example of the configuration of a load balance control unit 42 shown in FIG. 1.

DESCRIPTION OF EMBODIMENTS

Figure 1:
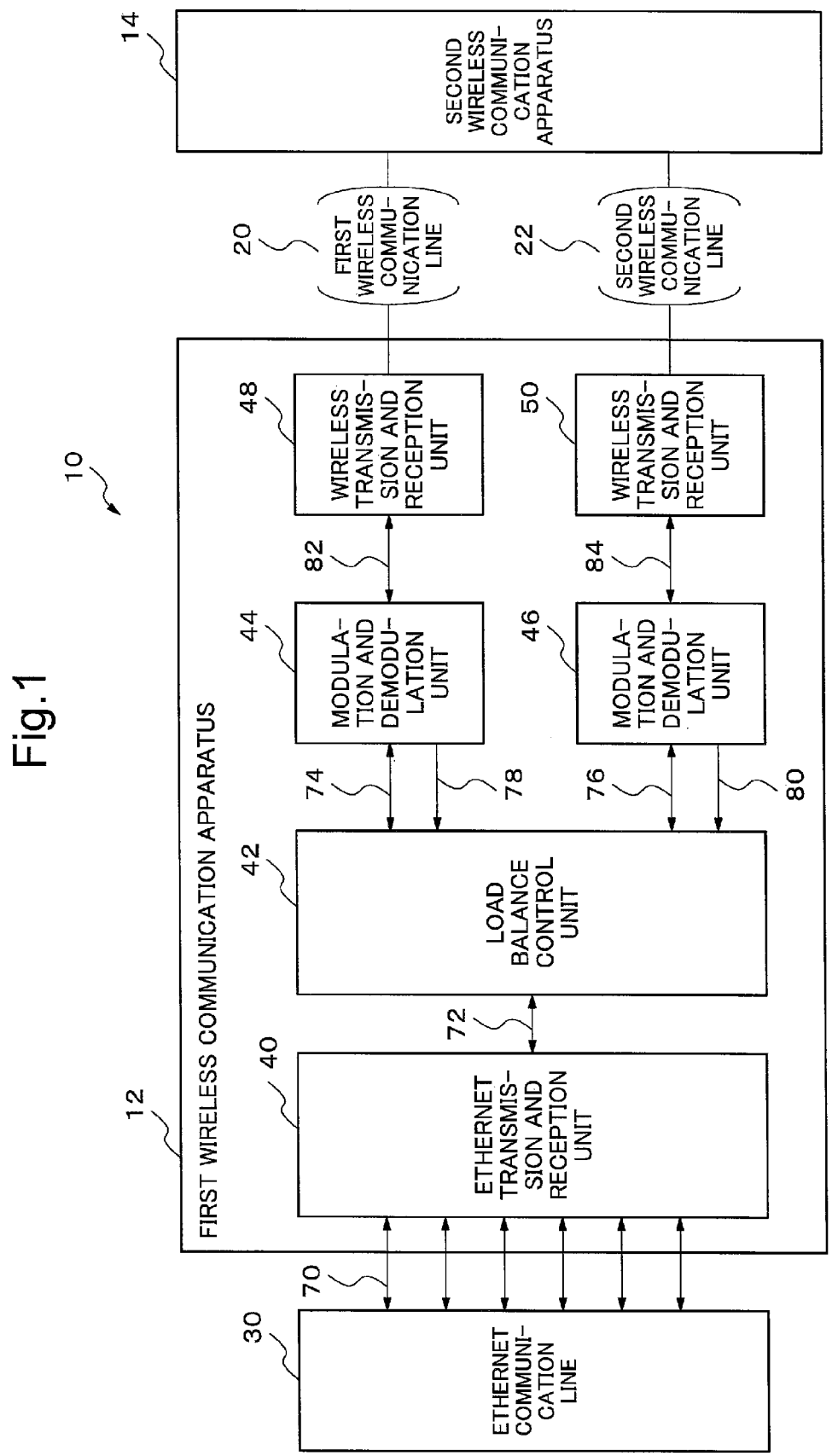
FIG. 1 is a block diagram illustrating an example of the configuration of a transmission system according to an embodiment of the present invention.

FIG. 1 is a block diagram illustrating an example of the configuration of a transmission system 10 according to an embodiment of the present invention. The transmission system 10 includes a first wireless transmission apparatus 12 and a second wireless transmission apparatus 14. Here, it is assumed that the first wireless transmission apparatus 12 and the second wireless transmission apparatus 14 have the same configuration. The first wireless transmission apparatus 12 and the second wireless transmission apparatus 14 are connected to each other via a plurality of wireless communication lines (in this embodiment, for example, a first wireless communication line 20 and a second wireless communication line 22). The first wireless communication line 20 and the second wireless communication line 22 are each capable of bidirectionally performing transmission and reception of data. That is, the transmission system 10 increases the bandwidth between two spots (in the case of FIG. 1, between the first wireless transmission apparatus 12 and the second wireless transmission apparatus 14) by providing the plurality of wireless communication lines. Further, the other side of the first wireless transmission apparatus 12 is connected to an Ethernet communication line 30, which is an example of the user side communication line.

As described above, the first wireless transmission apparatus 12 and the second wireless transmission apparatus 14 have the same configuration, and thus, hereinafter, the configuration of a wireless transmission apparatus according to this embodiment will be described by using the first wireless transmission apparatus 12 as the representative thereof. Further, in the following description, since the first wireless transmission apparatus 12 will be focused and described, hereinafter, the second wireless transmission apparatus 14 will be sometimes referred to as an "opposite apparatus".

The first wireless transmission apparatus 12 includes an Ethernet transmission and reception unit 40 (a reception unit) and a load balance control unit 42 (a load balance control unit). Further, the first wireless transmission apparatus 12 includes a modulation and demodulation unit 44 (46) (a modulation unit) and a wireless transmission and reception unit 48 (50) (a transmission unit) for each of the wireless communication lines (the first wireless communication line 20 and the second wireless communication line 22).

The Ethernet transmission and reception unit 40 performs switching of "Ethernet data 70", which has been received from the Ethernet communication line 30, to an opposite apparatus (in FIG. 1, for example, the second wireless transmission apparatus 14) as "opposite apparatus data 72". The Ethernet transmission and reception unit 40 performs switching of "opposite apparatus data 72", which has been received from the opposite apparatus, to the Ethernet communication line 30 as "Ethernet data 70". Here, the Ethernet transmission and reception unit 40 performs switching of each data from one apparatus to the other apparatus on the basis of a MAC address and a VLAN-ID (identification) of the each data. Here, the "MAC" is the abbreviation of "Media Access Control address". The "VLAN" is the abbreviation of "Virtual Local Area Network". In addition, since switching processing itself based on the MAC address and the VLAN-ID is a technology which is widely known to those skilled in the art, the descriptions thereof will be omitted here.

Basically, the load balance control unit 42 has the following first to third functions. The first function is the function of determining the threshold values of respective sorting buffers (not illustrated in FIG. 1) for the first wireless communication line 20 and the second wireless communication line 22 (i.e., a "threshold value determination function"). The second function is the function of sorting the "opposite apparatus data 72", which has been received from the Ethernet transmission and reception section 40, on the basis of predetermined criteria, and transmitting two kinds of sorted data ("sorted data 74" and "sorted data 76") to the respective modulation and demodulation units 44 and 46 (i.e., a "sorting function"). The third function is the function of performing control so as to fair the transmission orders of the respective two kinds of sorted data (the "sorted data 74" and the "sorted data 76") having been received from the modulation and demodulation units 44 and 46, and transmitting a series of data, the transmission order of which has been faired, to the Ethernet transmission and reception unit 40 as "opposite apparatus data 72" (i.e., a "transmission order control function"). Here, the first and second functions are the functions associated with the transmission of frames (specifically, the transmission of frames, which have been received from the Ethernet communication line 30, to the opposite apparatus). The third function is the function associated with the reception of frames (for example, the transmission of frames, which have been received from the opposite apparatus, to the Ethernet communication line 30). The details of the foregoing first to third functions of the load balance control unit 42 will be described below.

Here, this transmission system 10 has an adaptive modulation radio (AMR) function. Specifically, the modulation and demodulation unit 44 performs control of the modulation method for the first wireless communication line 20. The modulation and demodulation unit 46 performs control of the modulation method for the second wireless communication line 22. In addition, the changes of the modulation methods for the wireless communication lines may be independently determined by the modulation and demodulation units 44 and 46, or may be made on the basis of instructions from a higher-level control unit (not illustrated), respectively. Here, it is well known that the transmission capacity of a wireless communication line changes in accordance with the change of the modulation method for the wireless communication line. The modulation and demodulation unit 44 obtains the transmission capacity corresponding to the modulation method for the first wireless communication line 20, and transmits the obtained transmission capacity to the load balance control unit 42 as transmission capacity information 78. Meanwhile, the modulation and demodulation unit 46 obtains the transmission capacity corresponding to the modulation method for the second wireless communication line 22, and transmits the obtained transmission capacity to the load balance control unit 42 as transmission capacity information 80.

Further, the modulation and demodulation unit 44 transmits the "sorted data 74" bound for the first wireless communication line 20, which has been received from the load balance control unit 42, to the wireless transmission and reception unit 48 as "wireless communication line data 82" and further, transmits "wireless communication line data 82" from the first wireless communication line 20, which has been received from the wireless transmission and reception unit 48, to the load balance control unit 42 as the "sorted data 74". Meanwhile, the modulation and demodulation unit 46 transmits the "sorted data 76" bound for the second wireless communication line 22, which has been received from the load balance control unit 42, to the wireless transmission and reception unit 50 as "wireless communication line data 84" and further, transmits "wireless communication line data 84" from the second wireless communication line 22, which has been received from the wireless transmission and reception unit 50, to the load balance control unit 42 as the "sorted data 76".

The wireless transmission and reception unit 48 outputs the "wireless communication line data 82", which has been received from the modulation and demodulation unit 44, to the first wireless communication line 20, and further, transmits data, which has been inputted from the first wireless communication line 20, to the modulation and demodulation unit 44 as the "wireless communication line data 82". Meanwhile, the wireless transmission and reception unit 50 outputs the "wireless communication line data 84", which has been received from the modulation and demodulation unit 46, to the second wireless communication line 22, and further, transmits data, which has been inputted from the second wireless communication line 22, to the modulation and demodulation unit 4 as the "wireless communication line data 84"

FIG. 2 is a block diagram illustrating an example of the configuration of the load balance control unit 42 shown in FIG. 1. The load balance control unit 42 includes a transmission unit 100 and a reception unit 102.

The transmission unit 100 converts the "opposite apparatus data 72" forming Ethernet frames, which has been inputted from the Ethernet transmission and reception unit 40, into wireless frames, and outputs the wireless frames as the "sorted data 74" and the "sorted data 76" each forming wireless frames.

The transmission unit 100 includes a transmission buffer 200, a sorting determination unit 202 (a sorting determination means), a first sorting buffer 204 (a sorting buffer), a first wireless frame conversion unit 206, a second sorting buffer 208 (a sorting buffer), a second wireless frame conversion unit 210 and a threshold value determination unit 212 (a threshold value setting means).

The transmission buffer 200 writes therein the Ethernet frames corresponding to the "opposite apparatus data 72" having been inputted from the Ethernet transmission and reception unit 40, and further, reads out the Ethernet frames therefrom on the basis of reading-out requests from the sorting determination unit 202.

For each of the Ethernet frames, the sorting determination unit 202 determines whether or not, the summation of the retention amount of the first sorting buffer 204 before writing the relevant frame and the data amount (frame length) of the relevant frame, and the summation of the retention amount of the second sorting buffer 208 before writing the relevant frame and the data amount (frame length) of the relevant frame are less than the threshold values (the details thereof will be described below) having been set for the sorting buffers, respectively. The sorting determination unit 202 writes the relevant Ethernet frame into any one of the first sorting buffer 204 and the second sorting buffer 208 in accordance with the determination result (depending on the determination result, there is also a case where the relevant Ethernet frame is written into neither of the sorting buffers). For example, under the state where the summations are lower than the respective threshold values, the sorting determination unit 202 can sequentially write the Ethernet frames into the individual sorting buffers in accordance with the round robin method. Alternatively, under the state where, with respect to one of the sorting buffers, the summation exceeds the corresponding threshold value, the sorting determination unit 202 can continuously write the frames into the other one of the sorting buffers.

In addition, when writing the Ethernet frames into the individual sorting buffers, the sorting determination unit 202 gives a sequence ID (order information) to each of the Ethernet frames. Here, the sequence ID is the order of each of frames, in other words, the sequence ID is the index which indicates the transmission order of each of frames, and which is used when processing for transmission to downstream side apparatuses is performed by a receiving side apparatus. For example, in FIG. 1, in the case where the first wireless transmission apparatus 12 is the receiving side apparatus, the sequence ID indicates the transmission order of each of frames to be outputted to the Ethernet frame communication line 30.

The first sorting buffer 204 writes therein Ethernet frames to be outputted to the first wireless communication line 20, which are outputted from the sorting determination unit 202, and further, on the basis of requests from the first wireless frame conversion unit 206, the first sorting buffer 204 reads out therefrom the Ethernet frames to be outputted to the first wireless communication line 20, and outputs the read-out Ethernet frames to the first wireless frame conversion unit 206. The first sorting buffer 208 writes therein Ethernet frames to be outputted to the first wireless communication line 22, which are outputted from the sorting determination unit 202, and further, on the basis of requests from the second wireless frame conversion unit 210, the first sorting buffer 208 reads out therefrom the Ethernet frames to be outputted to the second wireless communication line 22, and outputs the read-out Ethernet frames to the second wireless frame conversion unit 210.

The first wireless frame conversion unit 206 converts the Ethernet frames having been read out from the first sorting buffer 204 into wireless frames, and outputs the wireless frames to the modulation and demodulation unit 44 as the "sorted data 74". The second wireless frame conversion unit 210 converts the Ethernet frames having been read out from the second sorting buffer 208 into wireless frames, and outputs the wireless frames to the modulation and demodulation unit 46 as the "sorted data 76".

The threshold value determination unit 212 receives the "transmission capacity information 78" (the transmission capacity corresponding to the modulation method for the first wireless communication line 20) from the modulation and demodulation unit 44, and further, receives the "transmission capacity information 80" (the transmission capacity corresponding to the modulation method for the second wireless communication line 22) from the modulation and demodulation part 46. The threshold value determination unit 212 determines a "first threshold value 90", which is the upper limit retention amount of the first sorting buffer 204, on the basis of the "transmission capacity information 78". The threshold value determination unit 212 determines a "second threshold value 92", which is the upper limit retention amount of the second sorting buffer 208, on the basis of the "transmission capacity information 80". The threshold value determination unit 212 receives the "transmission capacity information 78" and the "transmission capacity information 80" from the respective modulation and demodulation units 44 and 46 at a predetermined timing (for example, triggered by predetermined processing, or periodically at a predetermined cycle), and in accordance with the changes thereof, dynamically changes the respective "first threshold value 90" and "second threshold value 92".

The reception unit 102 converts the "sorted data 74" and the "sorted data 76" each forming wireless frames, which have been inputted from the respective modulation and demodulation units 44 and 46, into Ethernet frames, and outputs the Ethernet frames as the "opposite apparatus data 72" forming Ethernet frames.

The reception unit 102 includes a first Ethernet frame conversion unit 250, a second Ethernet frame conversion unit 252, a first reception buffer 254, a second reception buffer 256 and a transmission order control unit 258.

The first Ethernet frame conversion unit 250 converts the "sorted data 74" forming wireless frames, which has been received from the modulation and demodulation unit 44, into Ethernet frames, and writes the Ethernet frames into the first reception buffer 254. The second Ethernet frame conversion unit 252 converts the "sorted data 76" forming wireless frames, which has been received from the modulation and demodulation part 46, into Ethernet frames, and writes the Ethernet frames into the second reception buffer 256.

The first reception buffer 254 reads out the Ethernet frames in accordance with reading-out requests from the transmission order control unit 258, and outputs the read-out Ethernet frames to the transmission order control unit 258. The second reception buffer 256 reads out the Ethernet frames in accordance with reading-out requests from the transmission order control unit 258, and outputs the read-out Ethernet frames to the transmission order control unit 258.

The transmission order control unit 258 confirms the sequence ID of each of the Ethernet frames having been stored in the first reception buffer 254 and the second reception buffer 256, and on the basis of the sequence ID thereof, sequentially reads out each of the Ethernet frames to transmit the read-out Ethernet frames to the Ethernet transmission and reception unit 40 as the "opposite apparatus data 72".

Figure 3A:
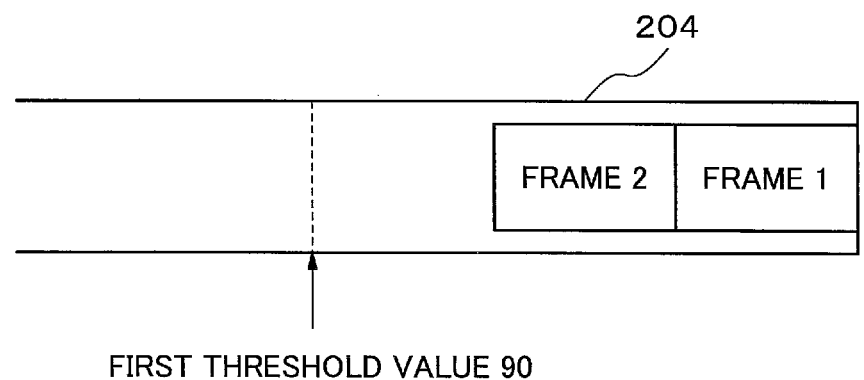
FIG. 3 is a conceptual diagram illustrating an example of frame writing processing performed by a first sorting buffer. A portion (a) indicates a case where, when a certain frame is written, the summation of the current retention amount and the data amount of the frame targeted for writing is less than a first threshold value. A portion (b) indicates a case where the summation is more than the first threshold value.
Figure 3B:
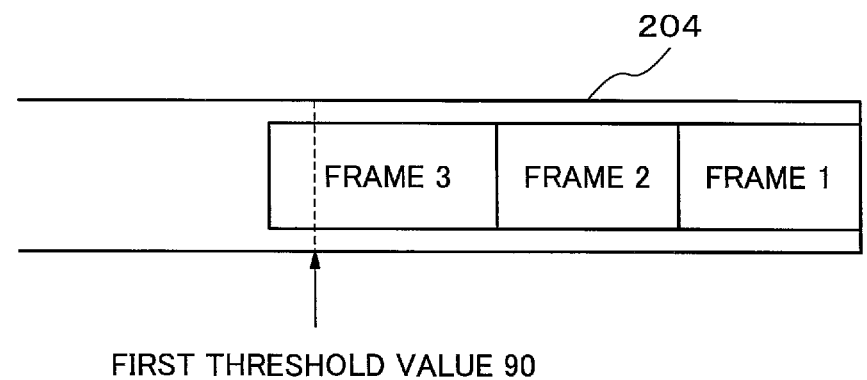

FIG. 3 is a conceptual diagram illustrating an example of frame writing processing performed by the first sorting buffer 204. In FIG. 3, a portion (a) indicates a case where, when a certain frame is written, the summation of the current retention amount and the data amount of the frame targeted for writing is less than the first threshold value 90. In FIG. 3, a portion (b) indicates a case where the summation thereof is more than the first threshold value 90. In the portion (a), for example, when a frame 2 is written into the first sorting buffer 204, the summation of the retention amount of the first sorting buffer 204 before writing the frame 2 (i.e., the data amount of a frame 1) and the data amount of the frame 2 is less than the first threshold value 90. Therefore, the sorting determination unit 202 determines that the frame 2 can be written into the first sorting buffer 204. In contrast, in the portion (b), for example, when a frame 3 is written into the first sorting buffer 204, the summation of the retention amount of the first sorting buffer 204 before writing the frame 3 (i.e., the summation of the data amount of the frame 1 and that of the frame 2) and the data amount of the frame 3 is more than the first threshold value 90. Therefore, the sorting determination unit 202 determines that the frame 3 cannot be written into the first sorting buffer 204. In addition, under the state shown in the portion (b), for example, the frame 1 has been read out, and as a result, if the summation of the retention amount of the first sorting buffer 204 before writing a next frame targeted for writing and the data amount of the next frame targeted for writing becomes less than the first threshold value 90, the next frame targeted for writing can be written into the first sorting buffer 204.

In addition, in the foregoing description, the first sorting buffer 204 has been taken as an example, but needless to say, the second sorting buffer 208 also performs the same action as that described above. Further, in FIG. 3, a case where frames are continuously written into the first sorting buffer 204 has been taken as an example. However, under the state where the second sorting buffer 208 is available for writing, the frames are sequentially written into the individual sorting buffers in accordance with the round robin method, and thus, the sequence ID of each of the frames which are written into the first sorting buffer 204 takes every second numerical value, such as 1, 3, . . . .

Figure 4A:
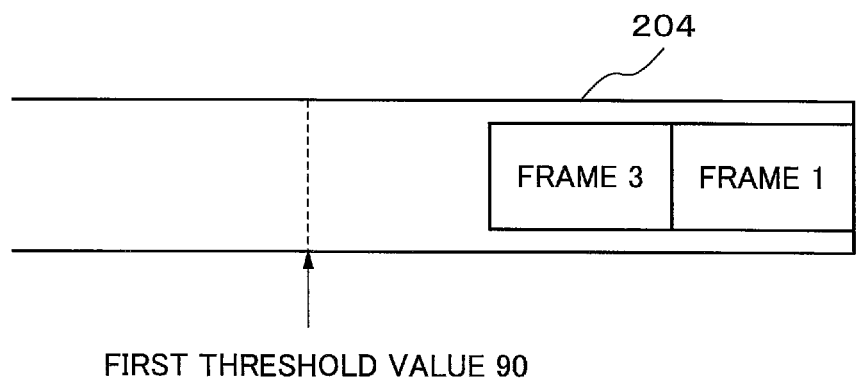
FIG. 4 is a conceptual diagram illustrating an example of sorting frames into a first sorting buffer and a second sorting buffer in the case where the transmission capacity of a first wireless communication line is equal to that of a second wireless communication line (that is, in the case where a first threshold value is equal to a second threshold value).
Figure 4B:
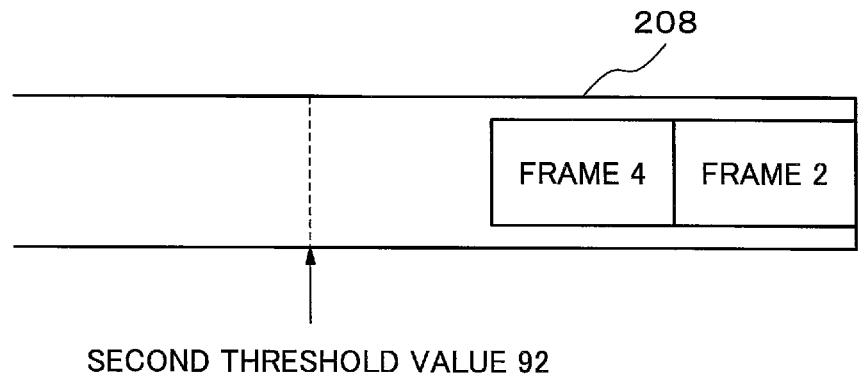

FIG. 4 is a conceptual diagram illustrating an example of the method for sorting frames into the first sorting buffer 204 and the second sorting buffer 208 in the case where the transmission capacity of the first wireless communication line 20 is equal to that of the second wireless communication line 22 (that is, in the case where the first threshold value 90 is equal to the second threshold value 92). In the case where the transmission capacity of the first wireless communication line 20 is equal to that of the second wireless communication line 22, the sorting determination unit 202 sequentially sorts frames, for example, frames 1 to 4, into the individual sorting buffers in accordance with the round robin method until the summation of the retention amount of at least one of the sorting buffers before writing a next frame targeted for writing and the data amount of the next frame targeted for writing becomes more than the threshold value of at least one of the sorting buffers.

Figure 5A:
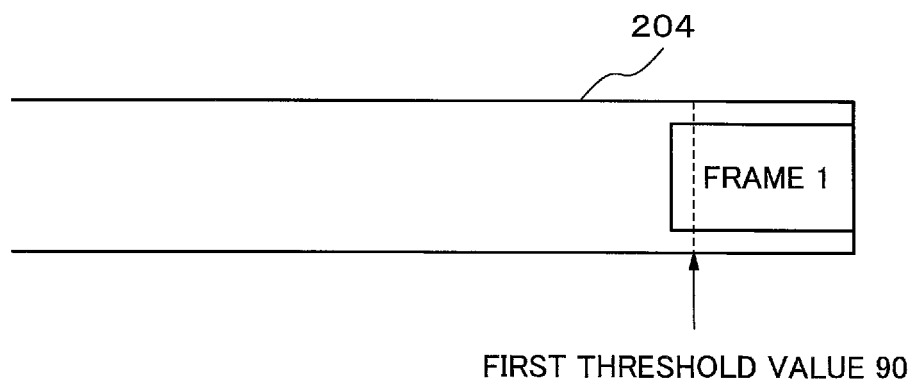
FIG. 5 is a conceptual diagram illustrating an example of sorting frames into a first sorting buffer and a second sorting buffer in the case where the transmission capacity of a first wireless communication line is different from that of a second wireless communication line (that is, in the case where a first threshold value is different from a second threshold value).
Figure 5B:
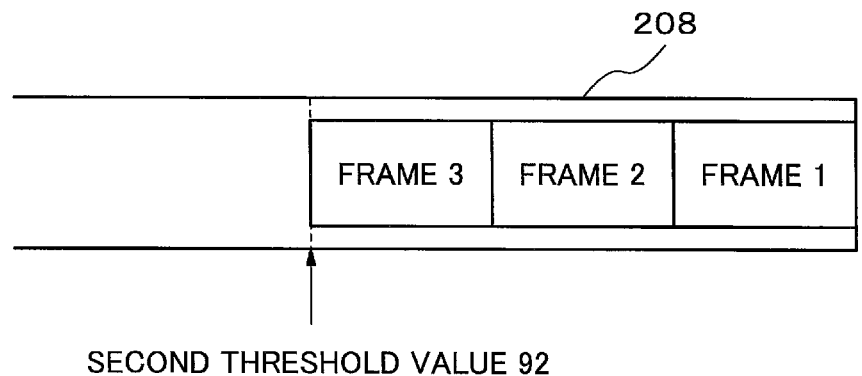

FIG. 5 is a conceptual diagram illustrating an example of the method for sorting frames into the first sorting buffer 204 and the second sorting buffer 208 in the case where the transmission capacity of the first wireless communication line 20 is different from that of the second wireless communication line 22 (that is, in the case where the first threshold value 90 is different from the second threshold value 92). In the case where the transmission capacity of the first wireless communication line 20 is different from that of the second wireless communication line 22, that is, for example, in the case where the transmission capacity of the second wireless communication line 22 is larger than that of the first wireless communication line 20, with respect to the first sorting buffer 204, the first threshold value 90 is set such as shown in FIG. 5. Meanwhile, with respect to the second sorting buffer 208, the second threshold value 92, which is larger than the first threshold value 90, is set. In this case, for example, the ratio of the first threshold value 90 and the second threshold value 92 can be set so as to be equal to the ratio of the transmission capacities. Under the state shown in FIG. 5, first, the sorting determination unit 202 determines whether the summation of the retention amount of the first sorting buffer 204 before writing a frame 1 targeted for writing (in the case of FIG. 5, this retention amount is "0" because this writing operation is a first one) and the data amount of the frame 1 targeted for writing is more than the first threshold value 90, or not. For example, if the data amount of the frame 1 is more the first threshold value 90, the sorting determination unit 202 determines that the frame 1 cannot be written into the first sorting buffer 204. Further, the sorting determination unit 202 determines whether the summation of the retention amount of the second sorting buffer 208 before writing a next frame 1 targeted for writing and the data amount of the frame 1 targeted for writing is more than the second threshold value 92, or not. Here, as described above, the second threshold value 92 is set so as to be larger than the first threshold value 90, and thus, the foregoing summation does not become more than the second threshold value 92. Therefore, the frame 1 can be written into the second sorting buffer 208. Subsequently, in the case where the data amount of each of frames 2 and 3 targeted for writing is more the first threshold value 90, and further, the summation of the retention amount of the second sorting buffer 208 before writing the frame 2 and the data amount of the frame 2, and the summation of the retention amount of the second sorting buffer 208 before writing the frame 3 and the data amount of the frame 3 are each less than the second threshold value 92, the frames 2 and 3 are written into the second sorting buffer 208. That is, in the case of FIG. 5, any frames are not written into the first sorting buffer 204; while the frames 1 to 3 are continuously written into the second sorting buffer 208.

In addition, for example, in the case where the data amount of the frame 2 is less than the first threshold value 90, and further, any frames are not written in the first sorting buffer 204, the frame 2 is written into the first sorting buffer 204. In this case, only the frame 2 is written into the first sorting buffer 204, and the frames 1 and 3 are written into the second sorting buffer 208.

Figure 6:
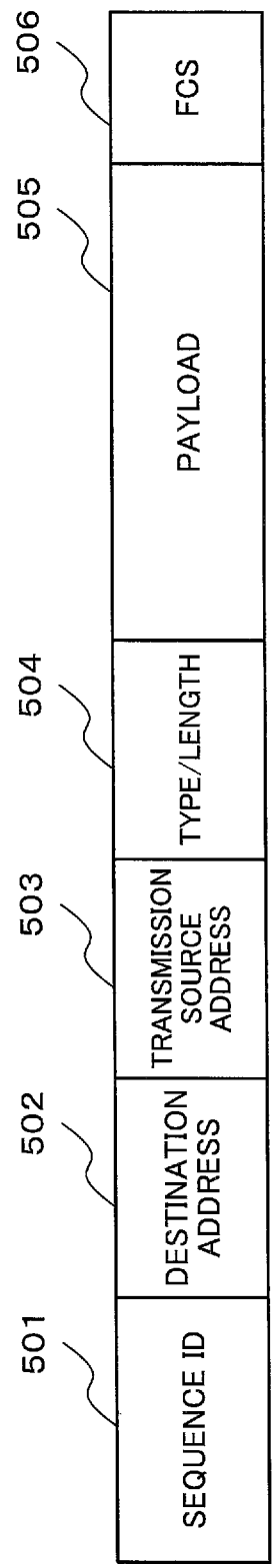
FIG. 6 is a frame-format diagram illustrating an example of the format of each of frames which are written into a first sorting buffer and a second sorting buffer.

FIG. 6 is a frame-format diagram illustrating an example of the format of each of frames which are written into the first sorting buffer 204 and the second sorting buffer 208.

First, a frame, such as an Ethernet frame, is on the basis of the MAC frame which is specified in the IEEE (Institute of Electrical and Electronics Engineers) 802.3. The MAC frame includes a destination address 502, a source address 503, a type/length 504, a payload 505 and an FCS (Frame Check Sequence) 506. Further, a sequence ID 501 is added to the head of the frame. Here, the sequence ID 501 is the order of the frame, in other words, the sequence ID 501 is the index which indicates the transmission order of the frame, and which is used when processing for transmission to downstream side apparatuses is performed by a receiving side apparatus. As described above, in the load balance control according to this embodiment, the sorting is not performed in accordance with such an unsophisticated methods as the round robin method, but is performed in accordance with the differences among the frame lengths, and the transmission capacities of the respective wireless communication lines, and thus, a situation where a receiving side apparatus cannot determine the transmission orders of the frames is likely to occur. Therefore, by giving the sequence ID 501 to each of the frames as described above, even if frames resulting from sorting are arrayed in irregular order, the receiving side apparatus can transmit the frames in accordance with the original order thereof.

Figure 7:
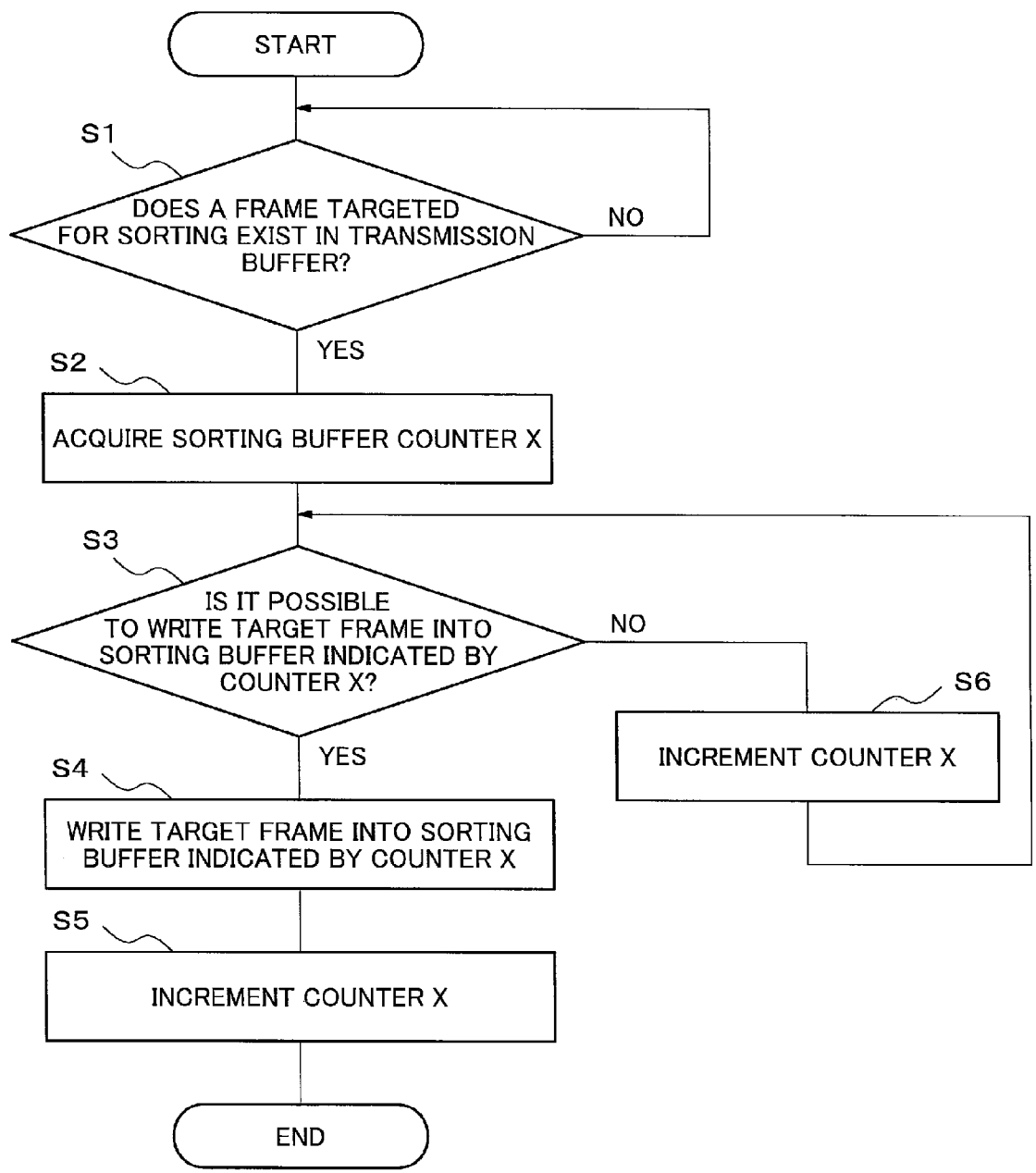
FIG. 7 is a flowchart illustrating an example of the operations of a sorting determination unit shown in FIG. 2.

FIG. 7 is a flowchart illustrating an example of the operations of the sorting determination unit 202 shown in FIG. 2. The processing shown in the flowchart is carried out for each of frames. Further, in advance of processing described below, the threshold value determination unit 212 determines the individual threshold values (for example, the "first threshold value 90" and the "second threshold value 92") of the respective sorting buffers (for example, the first sorting buffer 204 and the second sorting buffer 208).

The sorting determination unit 202 determines whether a frame targeted for sorting (hereinafter, which will be sometimes simplified and referred to as a "target frame") exists in the transmission buffer 200, or not (step S1). If a target frame exists (in the case of the determination "Yes" in step S1), the sorting determination unit 202 acquires the numerical value of a sorting-buffer counter X (hereinafter, referred to as just a "counter X") (step S2). Here, in the counter X, the number of a certain sorting buffer, which is a candidate for writing the target frame therein in this sorting, is indicated (that is, the number of a certain sorting buffer next to the sorting buffer which has performed writing in the last sorting is set). In addition, the counter X indicates a wireless-communication-line number, that is, a sorting-buffer number. Further, the numerical value of the counter X cyclically changes. That is, when the numerical value of the counter X has reached a maximum sorting-buffer number, it returns to "1", and repeats a count-up operation again. That is, in the case where two sorting buffers exist, the numerical value of the counter X changes such as 1→2→1→2 . . . .

The sorting determination unit 202 acquires the threshold value (for example, the first threshold value 90 or the second threshold value 92) of a sorting buffer indicated by the counter X. Further, the sorting determination unit 202 determines whether the target frame can be written into the sorting buffer indicated by the counter X, or not (step S3). Specifically, the sorting determination unit 202 determines whether the summation of the retention amount of the relevant sorting buffer before writing the target frame and the data amount (frame length) of the target frame is less than the threshold value of the relevant sorting buffer, or not.

If it is determined that the target frame can be written into the sorting buffer indicated by the counter X (in the case of the determination "Yes" in step S3), the sorting determination unit 202 writes the target frame into the sorting buffer indicated by the counter X (step S4). Further, the sorting determination unit 202 increments the counter X (step S5) to prepare for the sorting of a next target frame.

In contrast, if it is determined that the target frame cannot be written into the sorting buffer indicated by the counter X (in the case of the determination "No" in step S3), in order to investigate whether the target frame can be written into a next sorting buffer, or not, the sorting determination unit 202 increments the counter X (step S6), and further, investigates whether the target frame can be written into a sorting buffer indicated by the numerical value of the counter X (step S3).

Figure 8:
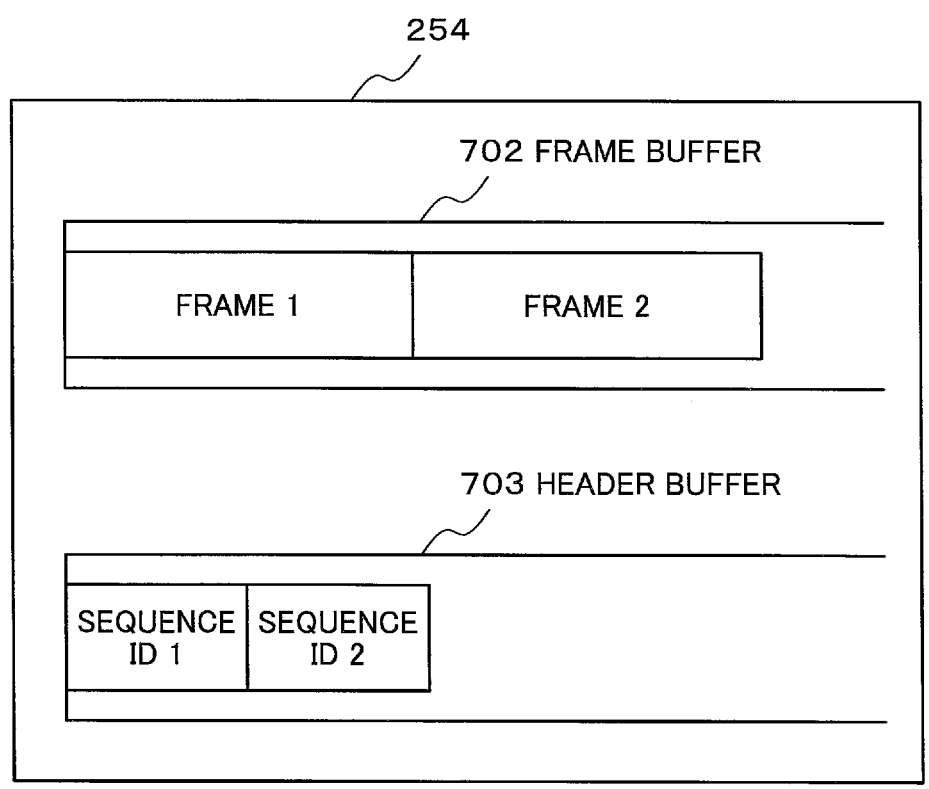
FIG. 8 is a memory map illustrating an example of the memory structure of a first reception buffer shown in FIG. 2.

FIG. 8 is a memory map illustrating an example of the memory structure of the first reception buffer 254 shown in FIG. 2. In addition, the memory structure of the second reception buffer 256 is the same as that of the first reception buffer 254 (naturally, even though the memory structure is the same, the stored content itself is different). Therefore, the descriptions of the second reception buffer 256 will be omitted.

The first reception buffer 254 is segmented into a frame buffer 702 for storing therein the MAC frame parts of respective frames, and a header buffer 703 for storing therein the sequence ID parts of respective frames. Operations of writing into the frame buffer 702 and the header buffer 703 are performed when each of frames has been received from the first Ethernet frame conversion unit 250.

In addition, the states of the first reception buffer 254 are classified into a wait state, a writing state and a ready state. The wait state indicates the state where both of the frame buffer 702 and the header buffer 703 are empty. The writing state indicates the state where only the operation of writing a sequence ID is completed (that is, the state where a corresponding MAC frame is not written at all, or is being written). The ready state indicates the state where the operation of writing the MAC frame is also completed.

Figure 9:
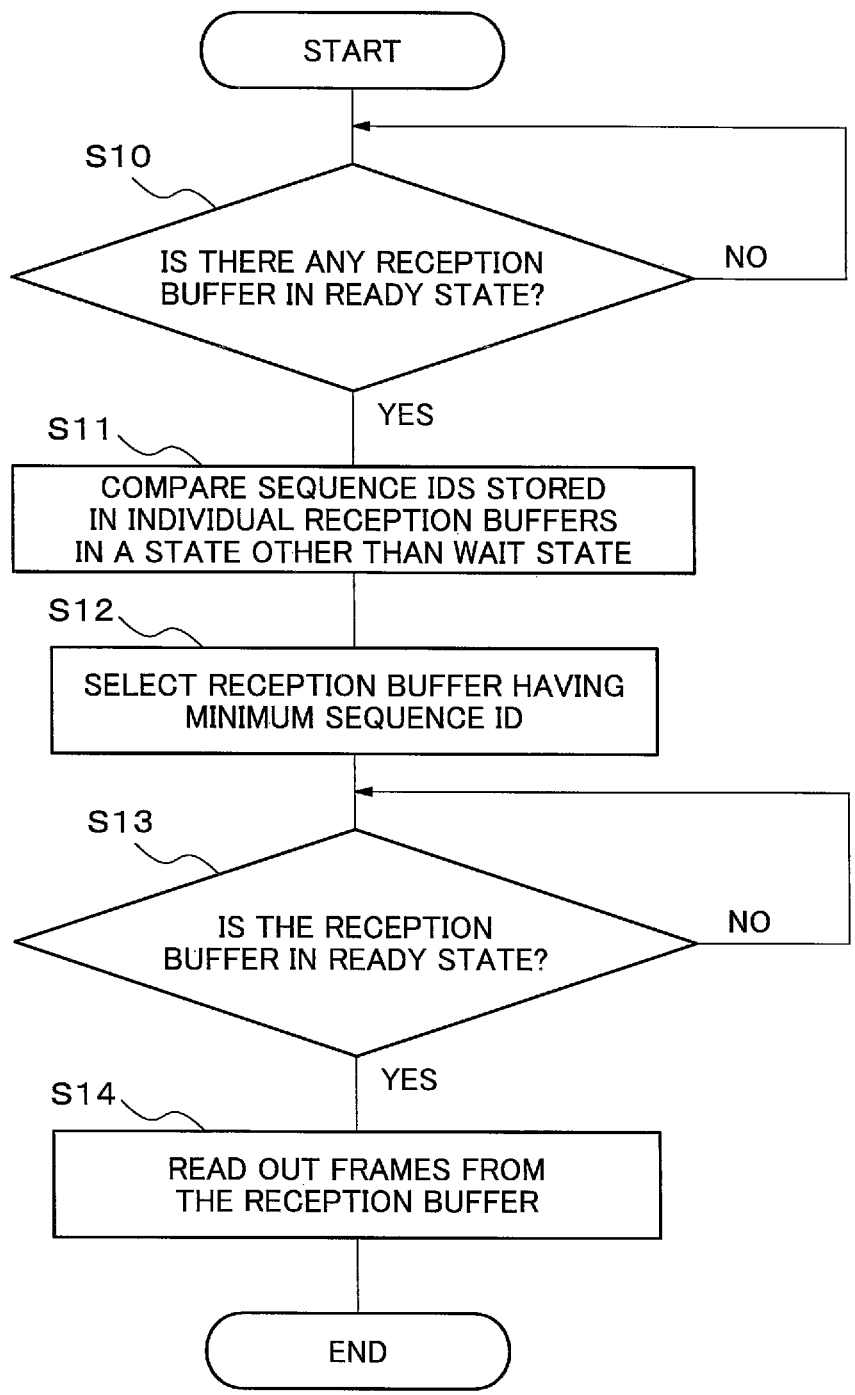
FIG. 9 is a flowchart illustrating an example of the operations of a transmission order control unit shown in FIG. 2.

FIG. 9 is a flowchart illustrating an example of the operations of the transmission order control unit 258 shown in FIG. 2.

First, the transmission order control unit 258 determines whether at least one reception buffer in the ready state exists among all reception buffers (for example, the first reception buffer 254 and the second reception buffer 256), or not (step S10). If at least one reception buffer being in the ready state exists (in the case of the determination "Yes" in step S10), the transmission order control unit 258 compares the sequence IDs with one another which are stored in the header buffers 703 of the reception buffers each being in a state other than the wait state (the state being the writing state or the ready state, that is, the state where at least an operation of writing a sequence ID is completed) (step S11). The transmission order control unit 258 selects a reception buffer which has the smallest sequence ID (step S12). The transmission order control unit 258 monitors the state of the selected reception buffer (step S13). If the relevant reception buffer is currently in the ready state (or, when it has transited to the ready state), the transmission order control unit 258 reads out a frame (that is, substantive content) from the relevant reception buffer (step S14). By repeating such processing described above, it is possible to read out and transmit the frames in regular order.

As described above, in the case of this embodiment, by employing, not such a rigid sorting method as the round robin method, but the sorting method based on the data amount (frame length) of a frame targeted for sorting, the current retention amounts of the sorting buffers and the threshold values (upper limit retention values) of the sorting buffers, it is possible to flexibly sort frames. Accordingly, even in the case where frames to be dealt with are variable length frames, and the threshold values of the sorting buffers dynamically change, it is possible to perform appropriate load sharing control of the individual wireless communication lines.

Meanwhile, as described above, in the case of this embodiment, frames which are written into each of the first sorting buffer 204 and the second sorting buffer 208 are not always arrayed in such regular order as the order resulting from performing a sorting in accordance with the round robin method, but are arrayed in irregular order. On the contrary, in the case of this embodiment, as described above, to each of sorted frames, a sequence ID indicating the order of the frame is added. At a frame receiving side, it is possible to fair each of the frames on the basis of this sequence ID. That is, even under the environment where the frame length of each of frames varies and the transmission capacity of each of the wireless communication lines dynamically changes, it is possible to guarantee the transmission order of the each of frames.

Further, in the case of this embodiment, there is provided the function of dynamically changing the threshold value of each of the sorting buffers (for example, the first sorting buffer 204 and the second sorting buffer 208), and the relevant threshold value is determined in accordance with the "transmission capacity" corresponding to the modulation method for each of the wireless communication lines (for example, the first wireless communication line 20 and the second wireless communication line 22). Therefore, it is possible to determine the threshold value more simply and accurately, as compared with the case where the threshold value is determined on the basis of the communication throughput of a corresponding communication line (i.e., the usage state of a corresponding communication line) or the like.

In addition, in the embodiment described above, the number of the wireless communication lines is not limited to two, but may be three or more.

Further, in the embodiment described above, the communication protocol, in which the length of each frame varies, is not limited to the Ethernet, but can be any other appropriate communication protocol. Further, the form of data targeted for sorting is not necessarily limited to the form of a frame, but may be, for example, the form of a packet.

Further, in the above-described embodiment, as described above, naturally, it is possible to deal with variable length frames, such as Ethernet frames, but needless to say, it is also possible to deal with fixed length data, such as asynchronous transfer mode (ATM) data.

[Another Embodiment]

Figure 10:
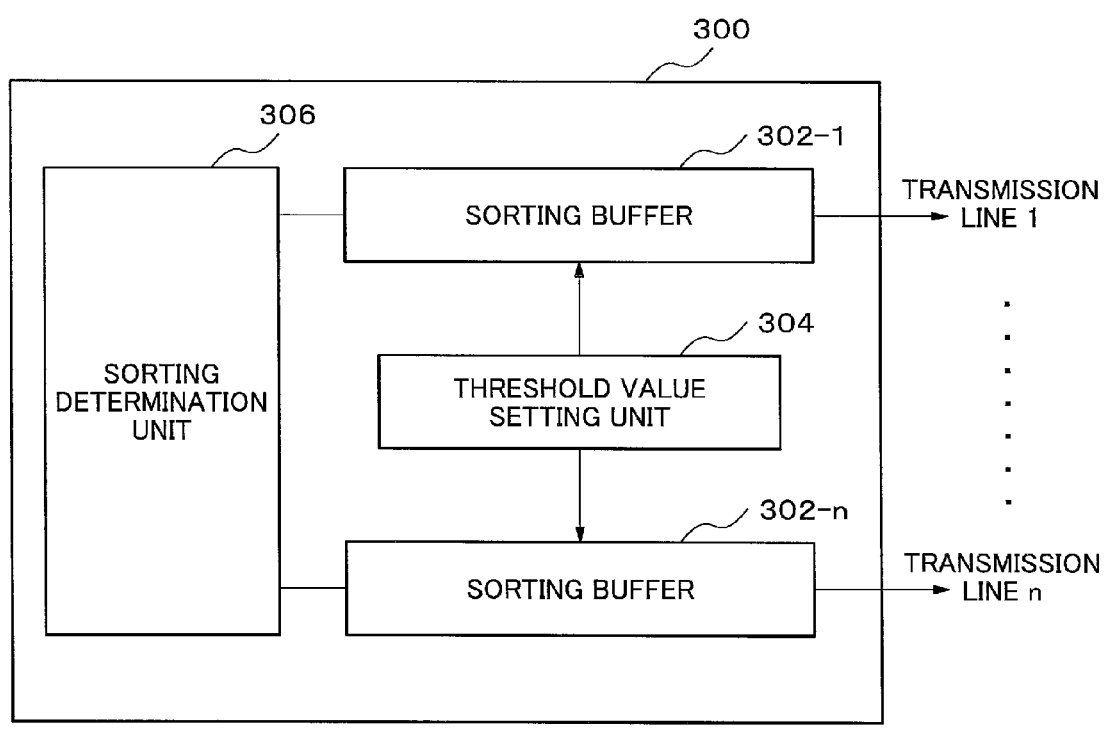
FIG. 10 is a block diagram illustrating an example of the configuration of a load balance control unit according to another embodiment of the present invention.

FIG. 10 is a block diagram illustrating an example of the configuration of a load balance control unit 300 according to another embodiment of the present invention. The load balance control unit 300 is equipped in, for example, a transmission apparatus for transmitting a plurality of units of data (frames, packets or the like), each being a piece of transmission data delimited by a given data length, to an opposite apparatus (not illustrated in FIG. 10) via a plurality of transmission lines 1 to n.

The load balance control unit 300 includes a plurality of sorting buffers 302-1 to 302-n provided for each of the transmission lines 1 to n, a threshold value setting unit 304 (a threshold setting means) and a sorting determination unit 306 (a sorting determination means).

The threshold value setting section 304 sets an upper limit retention threshold value for each of the sorting buffers 302-1 to 302-n. The sorting determination unit 306 determines, for each unit of data, in which of the sorting buffers 302-1 to 302-n the each unit of data is to be written, taking into consideration the retention state and the upper limit retention threshold value of each of the sorting buffers 302-1 to 302-n, and the data amount of the each unit of data.

As described above, in the case of this embodiment, by employing, not such a rigid sorting method as the round robin method, but the sorting method based on the data amount (frame length) of a frame targeted for sorting, the current retention amounts of the sorting buffers 302-1 to 302-n and the threshold values (upper limit retention values) of the sorting buffers 302-1 to 302-n, it is possible to flexibly sort frames. Accordingly, even in the case where frames to be dealt with are variable length frames, and the threshold values of the sorting buffers 302-1 to 302-n dynamically change, it is possible to perform appropriate load sharing control of the individual wireless communication lines.

The embodiments described above can be made operable by causing a computer circuit (not illustrated), such as a central processing unit (CPU), to perform control on the basis of control programs. In this case, these control programs are stored in, for example, a storage medium inside an apparatus or a system, or an external storage medium, and are read out to be executed by the foregoing computer circuit. As an example of the storage medium inside the system, for example, a read only memory (ROM), a hard disk or the like can be taken. As an example of the external storage medium, for example, a removable medium, a removable disk or the like can be taken.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-069521 filed on Mar. 25, 2010, the disclosure of which is incorporated herein in its entirety by reference.

REFERENCE SIGNS LIST

10: Transmission system
12: First wireless transmission apparatus
14: Second wireless transmission apparatus
20: First wireless communication line
22: Second wireless communication line
40: Ethernet transmission and reception unit
42: Load balance control unit
44: Modulation and demodulation unit
46: Modulation and demodulation unit
48: Wireless transmission and reception unit
50: Wireless transmission and reception unit
100: Transmission unit
102: Reception unit
200: Transmission buffer
202: Sorting determination unit
204: First sorting buffer
206: First wireless frame conversion unit
208: Second sorting buffer
210: Second wireless frame conversion unit
212: Threshold value determination unit
250: First Ethernet frame conversion unit
252: Second Ethernet frame conversion unit
254: First reception buffer
256: Second reception buffer
258: Transmission order control unit
300: Load balance control unit
302-1 to 302-n: Sorting buffer
304: Threshold value setting section
306: Sorting determination unit

The invention claimed is:

1. A load balance control unit included in a transmission apparatus for transmitting a plurality of units of data, each of said units of data being a piece of transmission data delimited by a given data length, to a corresponding apparatus via a plurality of transmission lines, the load balance control unit comprising:
sorting buffers provided for respective transmission lines;
a threshold setting unit that sets upper limit retention threshold values for respective sorting buffers, the upper limit retention threshold values being determined in accordance with transmission capacities corresponding to modulation methods for the transmission lines, respectively; and
a sorting determination unit that determines, for each of the units of data, in which of the sorting buffers each of the units of data is to be written, taking into consideration retention states and the upper limit retention threshold values of the respective sorting buffers, and a data amount of each of the units of data,
wherein a ratio of the upper limit retention threshold values of the respective sorting buffers corresponding to any two of the transmission lines is set to be equal to a ratio of respective transmission capacities of the any two of the transmission lines.

2. The load balance control unit according to claim 1, wherein the modulation methods dynamically change.

3. A load balance control unit included in a transmission apparatus for transmitting a plurality of units of data, each of said units of data being a piece of transmission data delimited by a given data length, to a corresponding apparatus via a plurality of transmission lines, the load balance control unit comprising:
sorting buffers provided for respective transmission lines;
a threshold setting unit that sets upper limit retention threshold values for respective sorting buffers;
a sorting determination unit that:
determines, for each of the units of data, in which of the sorting buffers each of the units of data is to be written, taking into consideration retention states and the upper limit retention threshold values of the respective sorting buffers, and a data amount of each of the units of data, and
writes each of the units of data into one of the sorting buffers, wherein, when writing each of the units of data into one of the sorting buffers, the sorting determination unit gives order information that indicates the order of the unit of data to the unit of data; and
a transmission unit that receives sorted units of data from a transmission apparatus which is a transmission source of the units of data, via the plurality of transmission lines, and transmits the units of data to another apparatus,
wherein the transmission unit comprises a transmission order control unit which confirms the order information of each of the units of data stored in the sorting buffers, sequentially reads out the units of data on the basis of the order information, and transmits the read-out units of data to the another apparatus.

4. A load balance control method for a transmission apparatus that transmits a plurality of units of data, each unit of data being a piece of transmission data delimited by a given data length, to a corresponding apparatus via a plurality of transmission lines, the load balance control method comprising:
  setting upper limit retention threshold values of sorting buffers that are provided for respective transmission lines, the upper limit retention threshold values being determined in accordance with transmission capacities corresponding to modulation methods for the transmission lines, respectively; and
  determining, for each of the units of data, in which of the sorting buffers each of the units of data is to be written, taking into consideration retention states and the upper limit retention threshold values of respective sorting buffers, and a data amount of each of the units of data,
  wherein a ratio of the upper limit retention threshold values of the respective sorting buffers corresponding to any two of the transmission lines is set so as to be equal to a ratio of respective transmission capacities of the any two of the transmission lines.

5. The load balance control method according to claim 4, further comprising writing each of the units of data into one of the sorting buffers, wherein, when writing each of the units of data into one of the sorting buffers, order information that indicates the order of the unit of data is given to the unit of data.

6. The load balance control method according to claim 4, wherein the modulation methods dynamically change.

7. A transmission apparatus comprising:
  a load balance control unit included in a transmission apparatus for transmitting a plurality of units of data, each of said units of data being a piece of transmission data delimited by a given data length, to a corresponding apparatus via a plurality of transmission lines, the load balance control unit comprising:
    sorting buffers provided for respective transmission lines;
    a threshold setting unit that sets upper limit retention threshold values for respective sorting buffers; and
    a sorting determination unit that determines, for each of the units of data, in which of the sorting buffers each of the units of data is to be written, taking into consideration retention states and the upper limit retention threshold values of the respective sorting buffers, and a data amount of each of the units of data;
  a reception unit configured at least to receive the units of data from a certain user side communication line, and supply the received units of data to the load balance control unit;
  a modulation unit configured at least to perform modulation processing on data received from the load balance control unit; and
  a transmission unit configured at least to transmit data received from the modulation unit to a corresponding apparatus.

8. The load balance control unit according to claim 3, wherein the upper limit retention threshold values are determined in accordance with transmission capacities corresponding to modulation methods for the transmission lines, respectively.

9. A load balance control unit included in a transmission apparatus for transmitting a plurality of units of data, each of said units of data being a piece of transmission data delimited by a given data length, to a corresponding apparatus via a plurality of transmission lines, the load balance control unit comprising:
  sorting buffers provided for respective transmission lines;
  a threshold setting unit that sets upper limit retention threshold values for respective sorting buffers, the upper limit retention threshold values being determined in accordance with transmission capacities corresponding to modulation methods for the transmission lines, respectively;
  a sorting determination unit that determines, for each of the units of data, in which of the sorting buffers each of the units of data is to be written, taking into consideration retention states and the upper limit retention threshold values of the respective sorting buffers, and a data amount of each of the units of data; and
  a transmission unit that receives sorted units of data from a transmission apparatus which is a transmission source of the units of data, via the plurality of transmission lines, and transmits the units of data to another apparatus,
  wherein the transmission unit comprises a transmission order control unit which confirms the order information of each of the units of data stored in the sorting buffers, sequentially reads out the units of data on the basis of the order information, and transmits the read-out units of data to the another apparatus.

10. The load balance control unit according to claim 1, further comprising a transmission unit that receives sorted units of data from a transmission apparatus which is a transmission source of the units of data, via the plurality of transmission lines, and transmits the units of data to another apparatus,
  wherein the transmission unit comprises a transmission order control unit which confirms the order information of each of the units of data stored in the sorting buffers, sequentially reads out the units of data on the basis of the order information, and transmits the read-out units of data to the another apparatus.

11. The load balance control unit according to claim 9, wherein the modulation methods dynamically change.

* * * * *